US007765783B2

(12) United States Patent
Schuller et al.

(10) Patent No.: US 7,765,783 B2
(45) Date of Patent: Aug. 3, 2010

(54) OPEN-END SPINNING DEVICE WITH AN AEROSTATIC AXIAL BEARING FOR A SPINNING ROTOR, AN AEROSTATIC AXIAL BEARING AND A PROCESS FOR MANUFACTURING AN AEROSTATIC AXIAL BEARING

(75) Inventors: Edmund Schuller, Ingolstadt (DE); Manfred Knabel, Ingolstadt (DE)

(73) Assignee: Rieter Ingolstadt Spinnereimaschinenbau AG, Ingolstadt (DE)

( * ) Notice: Subject to any disclaimer, the term of this patent is extended or adjusted under 35 U.S.C. 154(b) by 293 days.

(21) Appl. No.: 11/945,496

(22) Filed: Nov. 27, 2007

(65) Prior Publication Data

US 2008/0124204 A1 May 29, 2008

(30) Foreign Application Priority Data

Nov. 29, 2006 (DE) ...................... 10 2006 056 279

(51) Int. Cl.
*D01H 4/12* (2006.01)

(52) U.S. Cl. ........................................................ 57/404

(58) Field of Classification Search ........... 57/404–417; 384/121, 371

See application file for complete search history.

(56) References Cited

U.S. PATENT DOCUMENTS 4,371,220 A * 2/1983 Brucher ...................... 384/371
5,098,205 A 3/1992 Zehndbauer et al.
5,450,718 A * 9/1995 Knabel et al. ................. 57/406
5,522,211 A * 6/1996 Knabel et al. ................. 57/406
5,730,532 A * 3/1998 Knabel et al. ............... 384/121
5,765,358 A * 6/1998 Bock et al. ..................... 57/406
5,855,110 A * 1/1999 Bock et al. ..................... 57/406
6,401,444 B1 * 6/2002 Knabel et al. ................. 57/404
6,695,479 B2 * 2/2004 Pohn et al. .................. 384/100

FOREIGN PATENT DOCUMENTS

DE 2 325 163 12/1974

OTHER PUBLICATIONS

German Patent Office Search Report, Jun. 14, 2007.

* cited by examiner

*Primary Examiner*—Shaun R Hurley
(74) *Attorney, Agent, or Firm*—Dority & Manning, P.A.

(57) ABSTRACT

An open-end spinning device (1) with a spinning rotor (2) whose shaft end (11) is supported by an aerostatic axial bearing (10) with an air gap (18) located between a bearing plate (17) of the axial bearing (10) and the shaft end (11). The aerostatic axial bearing (10) comprises a bearing plate (17) and a throttle device (19) made from a porous graphite material placed before the bearing plate (17). The throttle device (19) is an stamped pressed, tablet-shaped molding with largely homogenous porosity. In a process for manufacturing an aerostatic axial bearing (10) for a spinning rotor (2) of an open-end spinning device (1), a throttle device (19) made from a porous graphite material is placed before the axial bearing (10). The throttle device (19) is stamped pressed in a press tool as a tablet-shaped molding.

17 Claims, 2 Drawing Sheets

13 1 2 12 3 4 11 19 17 10 9 14 16 18 8 6 7

OPEN-END SPINNING DEVICE WITH AN AEROSTATIC AXIAL BEARING FOR A SPINNING ROTOR, AN AEROSTATIC AXIAL BEARING AND A PROCESS FOR MANUFACTURING AN AEROSTATIC AXIAL BEARING

FIELD OF THE INVENTION

The present invention refers to an open-end spinning device equipped with a spinning rotor whose shaft end is supported by an aerostatic axial bearing with an air gap located between a bearing plate of the axial bearing and the shaft end. In this case, the air introduced into the air gap of the axial bearing passes through a preformed throttle device made from a porous carbon material. In addition, the invention refers to an aerostatic axial bearing for a spinning rotor of an open-end spinning device and to a process for manufacturing an aerostatic axial bearing equipped with a throttle device made of a porous carbon material for an aerostatic axial bearing.

BACKGROUND

An open-end spinning device with an aerostatic axial bearing for a spinning rotor is known, for example, from the generic EP 0 435 016 B1. The aerostatic bearing described therein has a bearing plate with a bearing surface that works with the end of the rotor shaft by allowing the air to blow out through the bearing surface and into the air gap of the axial bearing. The bearing plate has one or more bore holes for letting the air out. The materials from the bearing plate and the shaft end form a low-friction material pairing. Before the air exits the air gap, it passes through a throttle device made from a porous material, such as sintered materials or carbon materials, to name a few.

The throttle devices for a generic axial bearing known from the state of art are made from an extruded semi-finished product made of carbon material. In this case, the raw material is extruded at a temperature of approx. 2,500° C. to 3,000° C. to obtain a cylinder-shaped semi-finished product. In a subsequent work process, individual disks are sliced from this semi-finished product for later use as throttle devices in the axial bearing.

To increase the loading capacity of the aerostatic axial bearing under continuous duty, DE 100 62 106 A1 suggests adjusting the air flowing through the throttle device with numerous microscopic holes. If one has many bore holes compared to one or few, the bore deviations should even themselves out mutually and this should maintain a more precise airflow. In this case, one should be able to adjust the volume of air current flowing through the throttle device by increasing or decreasing the number of microscopic holes.

SUMMARY

A task of the present invention is to suggest an open-end spinning device equipped with an aerostatic axial bearing that allows a uniform airflow subject to only small fluctuations. Additionally, a corresponding axial bearing for a spinning rotor of an open-end spinning device and a manufacturing process for producing the axial bearing will be suggested. Additional objects and advantages of the invention will be set forth in part in the following description, or may be obvious from the description, or may be learned through practice of the invention.

In an open-end spinning device equipped with a spinning rotor, the shaft end of the spinning rotor is supported by an aerostatic axial bearing with an air gap located between a bearing plate of the axial bearing and the shaft end. In this case, the air introduced into the air gap passes through a throttle device placed before it and made from a porous carbon material. According to the invention, it foresees the throttle device to be a stamped-pressed, tablet-shaped molding with largely homogenous porosity.

In a process for manufacturing an aerostatic axial bearing for a spinning rotor of an open-end spinning device, a throttle device made from a porous carbon material is placed before the axial bearing. The invention provides the throttle device—as a tablet-shaped molding—to be stamped-pressed in a pressing tool. Due to the fact that the throttle device is designed like a molding, it is possible to produce for the aerostatic axial bearing a throttle device with a largely homogenous porosity. This homogeneous porosity allows one to achieve a uniform throttle effect in different throttle devices, so that when used in an open-end spinning machine, the same conditions largely prevail in every open-end spinning device. Since pore size and arrangement are uniform, the airflow through different throttle devices is subject to only a very small fluctuation range. As a result of this, the aerostatic bearing can be manufactured with more precision and at the same time, and the proportion of rejects during manufacturing can be lowered. It is especially advantageous for the throttle device to be manufactured from graphite, as this material has very favorable friction properties with the rotor shaft. It is recommended for the throttle device to be pressed from powder-shaped graphite material.

It is also advantageous for the molding surface to have a homogenous structure, particularly with respect to porosity. Contrary to latest technical advances, in which surface irregularities are caused by cutting an extruded semi-finished product, the tablet-shaped molding manufactured according to the invention has a homogeneous superficial structure, so that a uniform airflow is further supported in the various axial bearings or open-end spinning devices.

In addition to the above, it is also advantageous if the areas of the molding through which the compressed air flows through are not machined so the homogeneous pore structure of the surface is conserved.

It is particularly advantageous for the molding to have an open porosity ranging from 18% to 32%. It has been shown that as a result of this, optimal conditions with respect to air consumption and bearing stiffness can be achieved. It is also advantageous for the molding to have a density between 1.4 $g/cm^3$ and 1.6 $g/cm^3$.

According to a further development of the invention, it is favorable for the throttle device to have a reduced airflow at a preset operating pressure compared to conventional throttle devices. Since the throttle devices of individual open-end spinning devices are characterized by a largely uniform airflow, it is possible to minimize the preset airflow in order to lower compressed air consumption in spinning devices, which would lower energy costs and therefore production costs. The reduction of the total air volume flowing through allows one to maintain the air gap in the bearing and to adjust its stiffness very conveniently.

According to another design of the invention, it is advantageous if the throttle device can selectively adjust the airflow. As a result of this, the properties of the bearing—particularly its stiffness during spinning device operation—can be selectively adjusted.

On the one hand, the throttle device can adjust airflow by adjusting the molding's porosity. In a particularly advantageous design, however, airflow is adjusted by the molding thickness. This can be easily done by adjusting the press tool to the various thicknesses of the molding, which allows one to maintain the same quality and porosity in the manufacturing of the throttle device and to achieve different airflows by changing the molding thickness.

It is especially advantageous if the airflow lies in the range between 1.2 and 1.4 standard liters per minute (SL/min) at an air pressure of 7 bar. The uniform porosity of the molding allows one to indicate the desired airflow within a relatively narrow tolerance range and therefore to achieve largely uniform spinning conditions in the various spinning devices. As mentioned above, in order to adjust the airflow to other conditions, the molding thickness can be modified by adjusting the tool. Preferably, the molding should have a thickness between 2.0 mm and 3.8 mm.

According to a further development of the invention, the bearing plate and the throttle device are constructed in a one-piece design. In this case, the air flows into the air gap through the pores of the throttle or bearing material, or one can make boreholes on the side of the bearing plate to allow the air to flow through.

According to a further development of the invention, it is advantageous if the throttle device is an insert placed before the bearing plate. This arrangement facilitates the assembly of the throttle device and the adjustment of the airflow.

Besides, it is advantageous if the molding has been ground to a prescribed fit size. As a result of this, the throttle device can be pressed into the corresponding recess of the axial bearing without needing additional fastening means to achieve this.

In the manufacturing process for the aerostatic axial bearing according to the invention, the throttle device is pressed from a pulverized graphite material, which achieves uniform pore size and distribution.

The throttle device is preferably pressed at a temperature of 1,000° C. in order to produce throttle devices with mostly constant material properties and airflows under energetically favorable conditions. Additional energy savings are possible compared to the throttle devices of the state of art, which are extruded under temperatures from 2,500° C. to 3,000° C.

Preferably, the diameter of the throttle device after pressing should be ground to a prescribed fit size, thus facilitating assembly in a corresponding axial bearing through pressing in and preventing the air from flowing beside the throttle device.

It is particularly advantageous if the molding thickness can be adjusted by respectively adjusting the press tool height. As a result of this, moldings of different thicknesses can be manufactured with one single tool, and they can, in turn, allow the throttle device to easily adjust the airflow.

BRIEF DESCRIPTION OF THE DRAWINGS

Further advantages of the invention are explained with the help of the practical examples illustrated below, which show.

DETAILED DESCRIPTION

Figure 1:
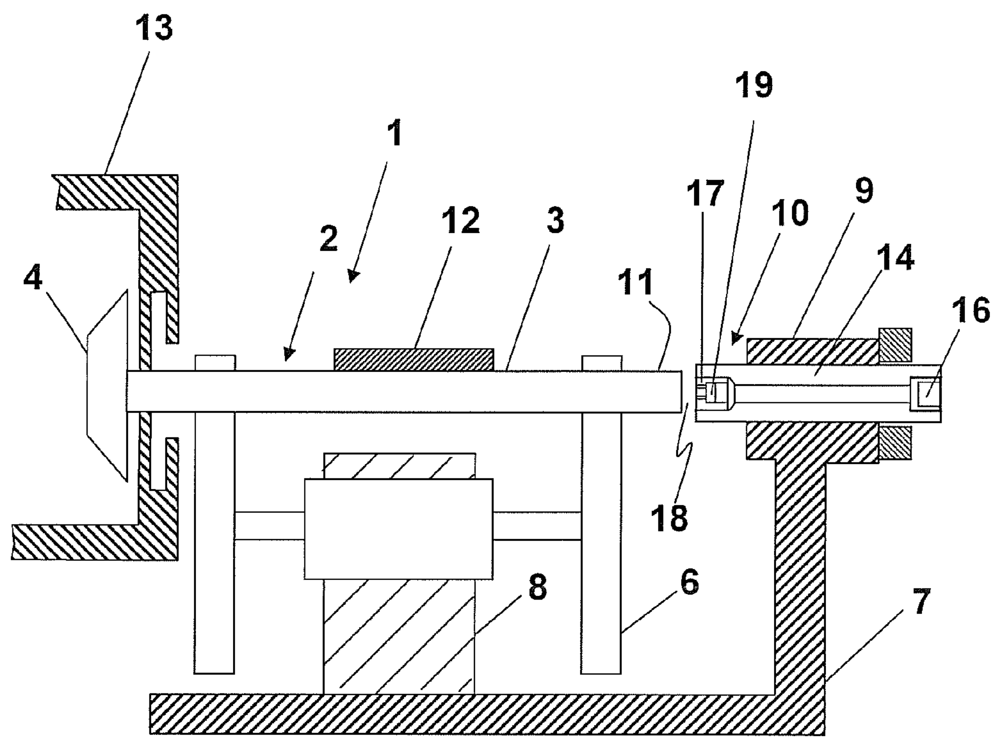
FIG. 1 a sectional view of an open-end spinning device according to the invention, FIG. 2 an aerostatic axial bearing according to the invention with a throttle developed as a bearing plate insert, FIG. 3 an aerostatic axial bearing according to the invention with a throttle device in one-piece design with the bearing plate, and FIG. 4 a throttle device manufactured in a process according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a sectional view of an open-end spinning device 1 equipped according to the invention. The open-end spinning device 1 has a spinning rotor 2 equipped with a shaft 3 and a rotor plate 4. The spinning rotor 2 is supported in the wedge-shaped gap of supporting disks 6 in a known way. The open-end spinning device 1 also has a bearing frame 7 with a seat 8 for the bearings of the supporting disks 6 and a seat 9 for an aerostatic axial bearing 10. The shaft end 11 of the spinning rotor 2 is supported by the aerostatic axial bearing 10 in the axial direction. According to this illustration, a centrally-driven tangential strap 12 that extends throughout the entire open-end spinning machine is provided for driving the spinning rotor 2. In addition, the open-end spinning device 1 has a rotor housing 13, in which the rotor plate 4 circulates.

An adjustable bushing 14 is arranged in the axial bearing 10, and the bushing is axially and adjustably arranged in the respective seat 9 of the bearing frame 7. The axial position of the bearing 10 is fixed in place by an attachment screw (not shown here). At the other end of the adjusting bushing 14 is a connection 16 for supplying the axial bearing 10 with pressurized air. Instead of the adjustable bushing 14 shown here, the axial bearing 10 can also be fixed by an adjusting screw.

Between the shaft end 11 of the spinning rotor 2 and a bearing plate 17 of the aerostatic axial bearing 10, an air gap 18 is created while the axial bearing 10 is operating in order to take up the axial power to the rotor shaft when the open-end spinning device is operating.

Figure 2:
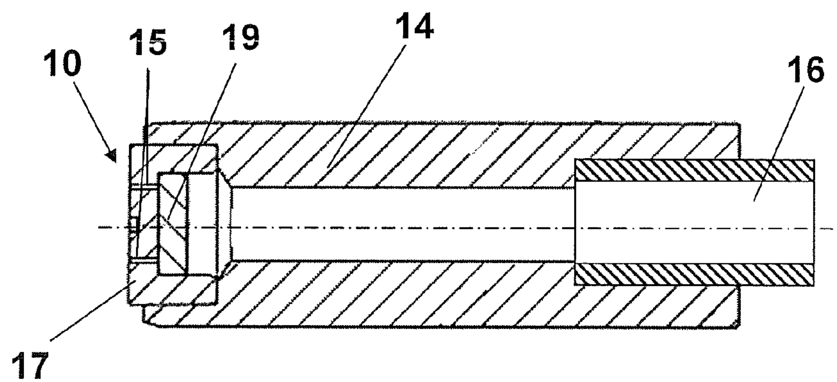

FIG. 2 shows a sectional view of an aerostatic axial bearing 10 contained in an adjustable bushing 14. In accordance with this illustration, the axial bearing 10 has been constructed in the shape of a pot and has bore holes 15 arranged in a circle for allowing the air to flow through in the area of the bearing plate 17 that faces the shaft end 11 of the spinning rotor 2. Instead of the bore holes arranged in a circle, however, the bearing plate 17 can also have one or several bore holes arranged in the most varied ways for allowing the air to flow out. Preferably, the bearing plate 17 is made of a low friction material so that even if the bearing plate 17 makes contact with the shaft end 11 of the spinning rotor 2 there is no excessive wear in the axial bearing 10. It is advantageous for the axial bearing to be made of plastic with good sliding properties, especially a polyimide, as the latter does not wear out easily, thereby prolonging the useful life of the axial bearing. However, it could also be made of other materials.

A connection 16 for the pressurized air that supplies the axial bearing 10 is arranged on the side of the adjusting bushing 14 facing the axial bearing 10. The pressurized air flows through the adjustable bushing 14 from the connection 16 to the bearing plate 17, where the air flows out into the air gap 18. A throttle device 19 has been placed before the axial bearing 10 to reduce the air flowing through the axial bearing 10, thereby advantageously increasing the stiffness of the bearing. The throttle device 19 is made of a porous material that allows only a limited airflow. According to the invention, the throttle device 19 is a stamped-pressed, tablet-shaped molding from a carbon material having a largely homogenous porosity.

The manufacturing of such a molding with mostly homogenous porosity takes place according to a process described in the invention, in which the throttle device 19 is stamped pressed as a tablet-shaped molding. The starting material is pulverized graphite, which makes it possible to manufacture throttle devices 19 with largely constant properties, so that air flowing through throttle devices 19 is subject to only narrow fluctuations. As a result of this and with respect to the airflow, the throttle device 19 can be manufactured more precisely, and in this case the proportion of rejects during manufacturing would also fall. Therefore, it would be especially advantageous to centrally supply individual spinning devices 1 arranged beside each other in an open-end spinning machine with pressurized air. While the known throttle devices made according to state of art are often subject to airflow fluctuations, mostly identical operating conditions in all spinning devices 1 of an open-end spinning machine can also be achieved with centralized pressurized air using the moldings according to the invention. Instead of adjusting the airflow through the throttle device 19 or the entire axial bearing 10 by changing the air pressure, a method known from the state of art, the throttle device 19 according to the invention (which is executed as a molding) allows an easy adjustment of air pressure by varying the thickness D (FIG. 4) of the molding.

Equivalent moldings with constant porosity can be stamped pressed in various thicknesses D (FIG. 4) with the process according to the invention. In order to adjust the airflow to certain requirements, moldings or throttle devices 19 of different thickness D can be used in the axial bearing 10. Preferentially, the diameter of the throttle devices 19 after the pressing process can be ground to a prescribed fit size and pressed into the respective dowel hole of the axial bearing 10. This allows the throttle device 19 to be easily mounted without gaps in the axial bearing 10 to prevent pressurized air from flowing by the throttle device 19.

Since the throttle devices 19 according to the invention are subject to only a slight fluctuation in airflow, it is possible to operate the axial bearing 10 with a reduced airflow compared to the state of art. It is best for the air to flow through the throttle device 19 at 1.2 and 1.4 SL/min and 6-bar excess pressure. The air gap can be maintained at a small size due to the lower total air quantity entering into the air gap 18, thus achieving a significant bearing stiffness. At the same time, the air consumption of the axial bearing 10—and, consequently, energy costs during the operation of the open-end spinning device 1 —can be lowered.

Figure 3:
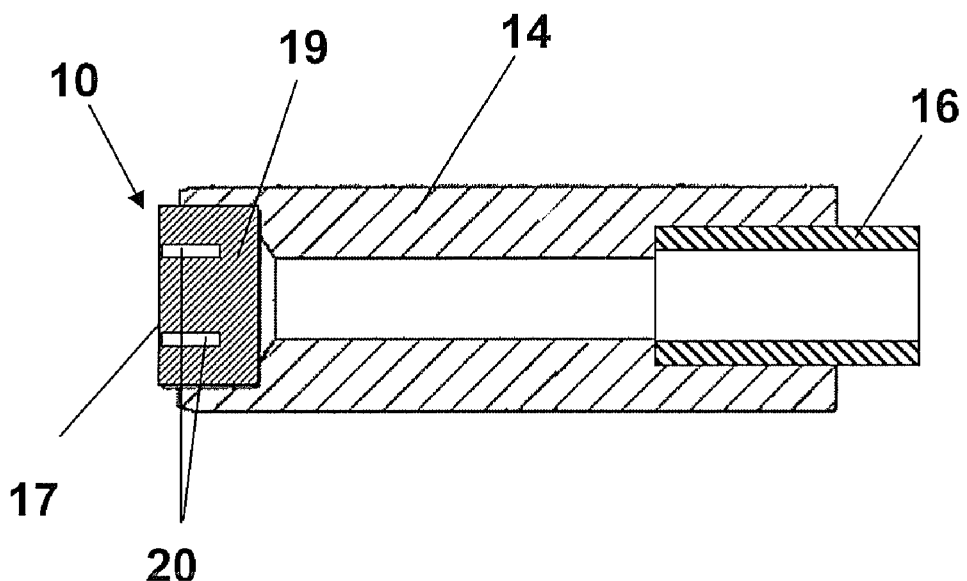

FIG. 3 shows another axial bearing 10 equipped with a throttle device 19 arranged in an adjusting bushing 14 in such a way, however, that the axial bearing 10 and the throttle 19 are executed together as one single piece. To achieve this, the axial bearing 10 has pocket bore holes 20 near its bearing plate 17 to allow air to flow out into the air gap 18. The area of the axial bearing 10 that looks away from the bearing plate 17 acts as a throttle device 19 because of its porosity. Since the axial bearing 10 or throttle device 19 are made of a low-friction carbon material, the contact between the shaft end 11 of the spinning rotor 2 and the bearing plate 17 of the axial bearing 10 causes little wear.

Figure 4:
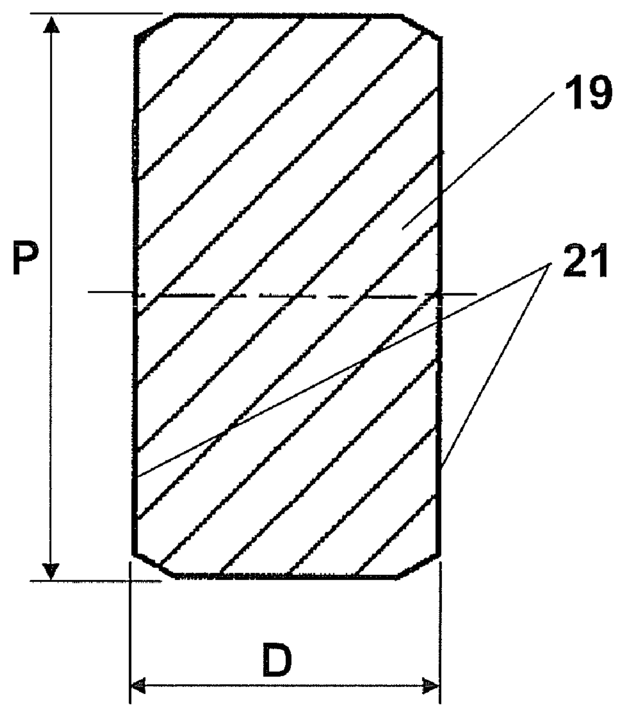

FIG. 4 shows a throttle device 19 that has been stamped pressed in a press tool at approx. 1,000° C. as a molding with homogenous porosity using a process according to the invention. Similar throttle devices 19 made from a carbon material were extruded with state-of-the art technology at 2,500° C. to 3,000° C. After the extrusion, the cylindrical intermediate product produced this way was eventually sliced into disks to obtain individual throttle devices 19. The slicing could have caused some unevenness on the surfaces 21 of the individual throttle devices. Since in the process according to the invention the starting material is now a powder, the individual throttle devices 19 are homogenous and have constant porosity. As a result of this, only slight airflow fluctuations are to be expected. At the same time, energy savings in the manufacturing of the throttle devices 19 are possible, since the tablet-shaped molding is pressed at a temperature of only 1,000° C. Additionally, the process according to the invention allows one to lower the proportion of rejects in the throttle devices 19.

Likewise, with the throttle device 19 according to the invention one can selectively adjust the air flowing through the throttle device through the respective thickness D of the molding. This can be easily done by adjusting the height of the press tool. This, in turn, allows one to minimize airflow through the axial bearing 10 in order to lower energy costs and this has also a positive influence on the bearing properties. Since in axial bearings 10 according to the invention the airflow fluctuates only slightly, the same conditions in all spinning devices 1 of an open-end spinning machine can be achieved even with a minimized airflow.

The invention is not limited to the practical examples described above. Modifications and combinations within the scope of the patent claims also fall under the invention.

The invention claimed is:

1. An open-end spinning device, comprising:

a spinning rotor having a rotor shaft;

an aerostatic axial bearing having a bearing plate, and defining an air gap between an end of said rotor shaft and said bearing plate; and said bearing further comprising a throttle device through which air is introduced into said air gap; said throttle device comprising a stamped pressed porous carbon material molding having a tablet-shape and a homogenous porosity;

said throttle device molded from a graphite powder with a defined thickness that achieves a desired airflow through said throttle device;

said throttle device having an open homogeneous porosity between about 18% and about 32%; and said throttle device comprising end surfaces oriented generally perpendicular to the direction of air flow therethrough, said end surfaces being void of machining processes such that said homogeneous porosity is maintained at said end surfaces.

2. The device as in claim 1, wherein said throttle device comprises a density between about 1.4 g/cm$^3$ and 1.6 g/cm$^3$.

3. The device as in claim 1, wherein said throttle device has a thickness between about 2.0 mm and 3.8 mm.

4. The device as in claim 3, wherein said throttle device has an airflow ranging from about 1.2 to about 1.4 SL/min at 7 bars pressure.

5. The device as in claim 1, wherein said throttle device and said bearing plate are formed as a single component,

6. The device as in claim 1, wherein said throttle device comprises a component separate from said bearing plate and is disposed before said bearing plate in a direction of air flown through said bearing.

7. The device as in claim 1, wherein said throttle device comprises an outer circumferential surface that is machined to a specified diameter.

8. An aerostatic axial bearing for an open-end spinning device having a spinning rotor with a rotor shaft, said bearing comprising:

a bearing plate disposed such that an air gap is defined between an end of the rotor shaft and said bearing plate; and a throttle device through which air is introduced into said air gap; said throttle device comprising a stamped pressed porous carbon material molding having a tablet-shape and a homogenous porosity;

said throttle device molded from a graphite powder with a defined thickness that achieves a desired airflow through said throttle device;

said throttle device having an open homogeneous porosity between about 18% and about 32%; and said throttle device comprising end surfaces oriented generally perpendicular to the direction of air flow therethrough, said end surfaces being void of machining processes such that said homogeneous porosity is maintained at said end surfaces.

9. The bearing device as in claim 8, wherein said throttle device comprises a density between about 1.4 g/cm$^3$ and 1.6 g/cm$^3$.

10. The bearing device as in claim 8, wherein said throttle device has a thickness between about 2.0 mm and 3.8 mm.

11. The bearing device as in claim 10, wherein said throttle device has an airflow ranging from about 1.2 to about 1.4 SL/min at 7 bars pressure.

12. The bearing device as in claim 8, wherein said throttle device and said bearing plate are formed as a single component.

13. The bearing device as in claim 8, wherein said throttle device comprises a component separate from said bearing plate and is disposed before said bearing plate in a direction of air flown through said bearing.

14. The bearing device as in claim 8, wherein said throttle device comprises an outer circumferential surface that is machined to a specified diameter.

15. A process for making a throttle device for an aerostatic bearing for an open-end spinning machine having a spinning rotor with a rotor shaft, comprising stamp pressing the throttle device with a press tool from a pulverized graphite material into a tablet-shaped molding having a specified thickness to achieve a desired airflow therethrough, the throttle device thereby having a uniform porosity therethrough; the throttle device being pressed at a temperature of about 1,000 degrees C.

16. The process as in clam 15, further comprising grinding the throttle device to a specified diameter after molding without machining the end surfaces of the throttle device.

17. The process as in claim 15, further comprising adjusting the press tool to vary the thickness of the throttle device so as to achieve a desired airflow rate through the throttle device as a function of the thickness.

* * * * *